Dec. 26, 1922.  1,439,773

C. H. VEEDER.
COUNTING MECHANISM.
FILED FEB. 18, 1920.

INVENTOR
Curtis Hussey Veeder
BY
Redding & Greeley
ATTORNEYS

Patented Dec. 26, 1922.

1,439,773

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

COUNTING MECHANISM.

Application filed February 18, 1920. Serial No. 359,740.

*To all whom it may concern:*

Be it known that I, CURTIS HUSSEY VEEDER, a citizen of the United States, residing in the city of Hartford, in the State of Connecticut, have invented certain new and useful Improvements in Counting Mechanisms, of which the following is a specification, reference being had to the accompanying drawings, forming a part hereof.

This invention has particularly in view the production of a counting mechanism adapted especially for use in connection with a small moving picture camera for the purpose of indicating the number of feet of film exposed. The counting mechanism is so constructed and arranged that it can be applied to the inner side of one wall, preferably the door, of the box, shall take up but little space within the box, can be read from the outside, shall be actuated by the usual film crank when the box is closed, and shall be capable of being reset, as to one dial or indicator, which may be called the main or total indicator, while the camera box is open for adjustment of the film, and as to the second dial or indicator at any time. The invention will be more fully described hereinafter with reference to the accompanying drawing in which it is illustrated and in which—

Figure 1:
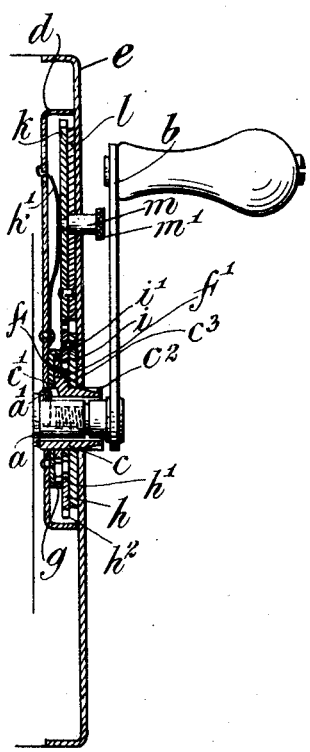
Figure 1 is a view in section on the plane indicated by the broken line 1—1 of Figure 2, showing a portion of the camera box, with the counting mechanism applied thereto, the usual film operating crank being shown in elevation.
Figure 2:
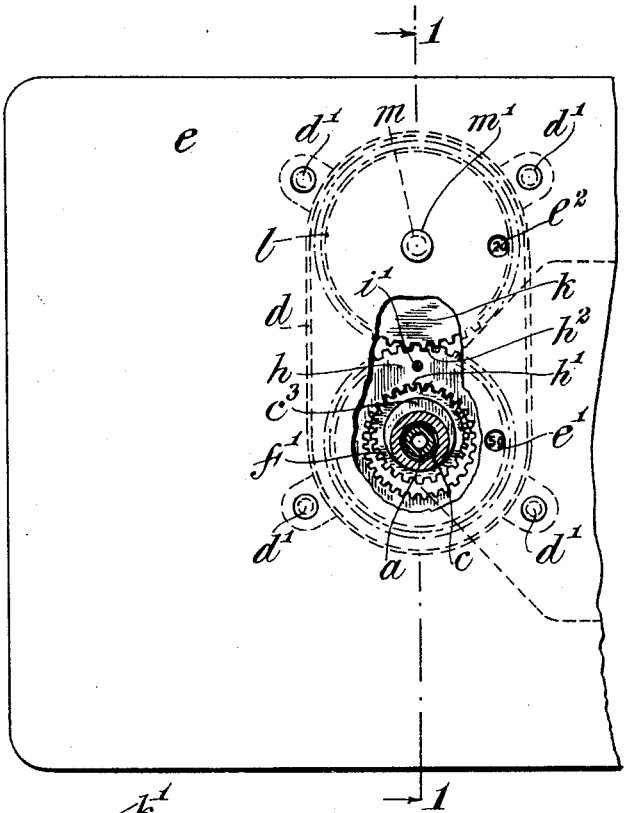
Figure 2 is a view of the same in elevation, with the crank removed, a portion of the outer wall broken out and the eccentric-bearing sleeve in section, this figure showing the annular gear and the differential gear in engagement therewith.
Figure 3:
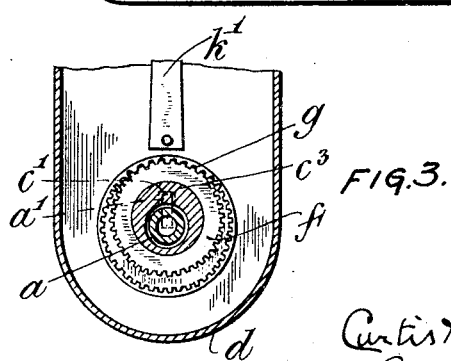
Figure 3 is a detail view showing the stationary gear and the gear in engagement therewith.

The film winding mechanism may be of any usual or suitable construction and is sufficiently indicated in the drawing by the main shaft, a portion of which is shown at $a$ and with which the hub of the crank $b$ is removably connected by screw threading in the usual manner, so that the crank can be removed when the camera box is to be opened. The shaft $a$ is provided with a driving pin $a'$ adapted to enter, when the camera is closed, a slot $c'$ in a sleeve shaft $c$ which is supported at one end in the case $d$ of the counting mechanism and at the other end in the wall or door $e$ of the camera box. The outer end of the sleeve shaft $c$ is knurled, as at $c^2$, so that when the crank is removed and the camera box is opened the sleeve shaft $c$ can be rotated for the purpose of resetting one of the indicator dials. The case $d$, which encloses the counting mechanism, is secured to the inner side of the wall or cover $e$, as by rivets $d'$. The wall or cover $e$ is provided with sight openings as at $e'$, $e^2$.

The sleeve shaft $c$, rotated with the drive shaft $a$, is formed with an eccentric $c^3$ on which is mounted a double gear $f$, $f'$, the two gears having different numbers of teeth, as twenty-seven teeth on the gear $f$ and twenty-six teeth on the gear $f'$, thus constituting, with the co-operating gears, a high reduction, differential gear. The gear $f$ meshes with an internal gear $g$, secured to the casing $d$, while the gear $f'$ meshes with the internal teeth $h'$ of an annular gear $h$ mounted to rotate on the concentric portion of the sleeve shaft $c$. As the sleeve shaft is rotated and the eccentric $c^3$ is carried around with it the double gear $f$, $f'$ is rolled around in mesh with the internal gear $g$, is rotated slowly on its own axis, and through its engagement with the internal gear teeth $h'$, occasions a still slower rotation of the annular gear $h$ on its own axis. To the annular gear $h$ is secured, as by rivets $i^1$, the indicator dial $i$, the figures of which are successively brought to view at the sight opening $e^1$, thus showing either how many feet of film have been exposed or how many feet of film remain unexposed, according to the reading of the figures on the indicator dial, as from 0 to 50, for example, or from 50 to 0.

The indicator dial $i$ may be called a total indicator, showing either the total number of feet of film exposed or the total number of feet of film unexposed. The second indicator dial, about to be referred to, may be termed the trip indicator, showing the number of feet of film exposed at one time. This second indicator comprises a gear $k$ in mesh with the external teeth $h^2$ of the annular gear $h$ and having the same pitch diameter, so as to be rotated synchronously with the annular gear $h$. To the gear $k$ is secured, as by rivets or otherwise, an indicator dial $l$, the figures of which are visible successively through the sight opening $e^2$. The gear $k$ and dial $l$ are fixed upon a spindle $m$ which is mounted in the wall or door $e$ and has on its outer end a knurled knob $m'$ by which it may be rotated. The gear $k$ is held normally in engagement with the gear teeth $h^2$ of the annular gear $h$ by a spring $k'$ which is fixed to the case $d$ and bears against the gear $k$. If it is desired to reset the second or trip indicator $l$ to zero the gear $k$ is first disengaged from the gear $h^2$ by inward pressure on the spindle $m$ and is then rotated until the zero is exposed at the sight opening $e^2$. This may be done at any time, whether the camera box is opened or not. The first or total indicator can be reset to zero, without disturbing the film, only when the crank has been removed and the door $e$ has been opened to disengage the sleeve shaft $c$ from the drive shaft $a$, when, by the application of the fingers to the knurled end of the sleeve shaft $c$, the first or total indicator can be reset to zero. The second or trip indicator is disconnected from the total indicator during the resetting of the total indicator unless the reading of both indicators at the sight openings $e'$ and $e^2$ is the same.

It will be understood that changes in details of construction and arrangement can be made to suit different conditions of use and that the invention is not restricted to the precise construction shown except as pointed out in the claims.

I claim as my invention:

1. The combination of a camera box having a movable cover, a film drive shaft mounted in the box, a sleeve shaft mounted rotatably in the cover and adapted for engagement with the drive shaft, an eccentric carried by the sleeve shaft, a double differential gear mounted on the eccentric, a stationary, internal gear in engagement with one member of the differential gear, an internal, annular gear mounted rotatably on the concentric portion of the sleeve shaft and in engagement with the other member of the differential gear, and a film indicator carried with the annular gear.

2. The combination of a camera box having a movable cover, a film drive shaft mounted in the box, a sleeve shaft mounted rotatably in the cover and adapted for engagement with the drive shaft, an eccentric carried by the sleeve shaft, a double differential gear mounted on the eccentric, a stationary, internal gear in engagement with one member of the differential gear, an internal, annular gear mounted rotatably on the concentric portion of the sleeve shaft and in engagement with other member of the differential gear and having gear teeth on its periphery, an indicator carried with the annular gear, and a separate indicator carried by the cover and arranged to be driven by the peripheral teeth of the annular gear.

3. The combination of a camera having a movable cover, a main shaft, and a counting mechanism carried by the cover and including a drive shaft located in the cover concentrically with the main shaft, said main shaft and said drive shaft having pin and slot driving connection to permit the drive shaft to be disengaged from the main shaft when the cover is opened.

4. The combination of a camera having a movable cover, a main shaft, and a counting mechanism carried by the cover and including a sleeve drive shaft with a bearing in the cover and concentric with the main shaft, said main shaft and said sleeve drive shaft having a pin and slot driving connection to permit the drive shaft to be disengaged from the main shaft when the cover is opened.

5. The combination of a camera having a movable cover, a main shaft, a crank detachably engaged with the main shaft, and a counting mechanism carried by the cover and including a sleeve drive shaft with a bearing in the cover and concentric with the main shaft, said main shaft and said sleeve drive shaft having a pin and slot driving connection to permit the drive shaft to be disengaged from the main shaft when the cover is opened.

This specification signed this 9th day of February A. D. 1920.

CURTIS HUSSEY VEEDER.